Figure 1:
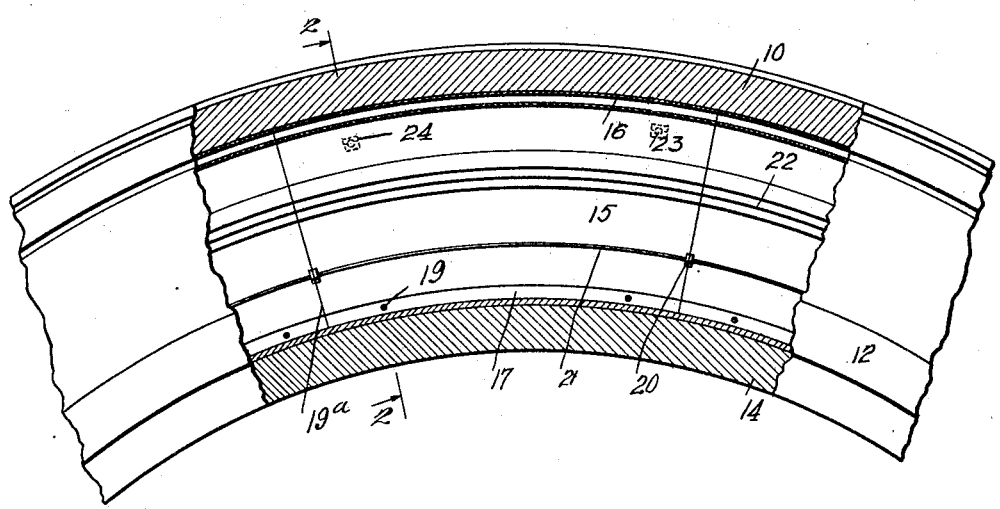

W. B. SHAW.
RESILIENT TIRE.
APPLICATION FILED AUG. 18, 1920.

1,384,678.

Patented July 12, 1921.

WITNESSES

INVENTOR
WILLIAM B. SHAW
BY
ATTORNEYS

UNITED STATES PATENT OFFICE.

WILLIAM B. SHAW, OF NEW YORK, N. Y.

RESILIENT TIRE.

1,384,678. Specification of Letters Patent. Patented July 12, 1921.

Application filed August 18, 1920. Serial No. 404,422.

*To all whom it may concern:*

Be it known that I, WILLIAM B. SHAW, a citizen of the United States, and a resident of the city of New York, borough of Manhattan, in the county and State of New York, have invented a new and Improved Resilient Tire, of which the following is a full, clear, and exact description.

This invention relates to resilient tires, and has reference more particularly to a resilient member adapted to be placed on the inside of a tire casing.

An object of this invention is to provide a resilient filling for a rubber casing which will be puncture proof and which will be fully equivalent to a pneumatic cushion when traveling.

Reference is to be had to the accompanying drawing forming a part of this specification, in which it is understood that the drawing illustrates only one form of the invention, and in which—

Figure 2:
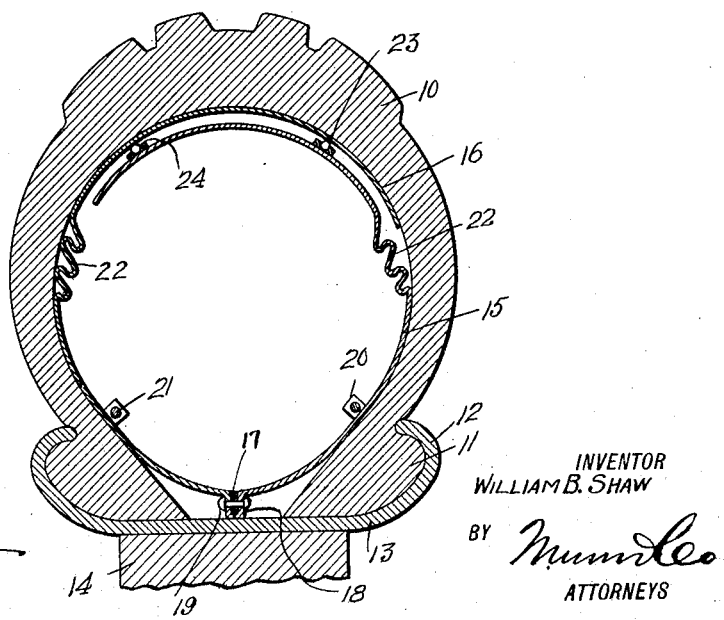

Figure 1 is a side elevation of a portion of an automobile tire with parts broken away to disclose the construction of the resilient inner filling or sleeve Fig. 2 is a sectional view through the tire on the line 2—2 of Fig. 1.

Referring to the accompanying drawing by numerals, 10 indicates the casing of a tire which may be of any desirable shape or construction, and which is usually provided with beads 11 adapted to fit between flanges 12 of a demountable rim 13, said rim being secured to a wheel 14. When the casing 10 is in use, it ordinarily receives an inflated rubber tube, which is easily punctured and gives considerable trouble. In order to obviate this difficulty, a filler tube is provided in lieu of the usual pneumatic tube, which comprises a plurality of arcuate tubular sections preferably constructed of steel or any other suitable material. The sections are of identical construction and each includes a pair of members 15 of substantially semicircular formation in cross section, said members being connected at the inner side of the tire and provided with overlapping edges 16 adjacent the outer side or tread portion thereof. The connected edges of the members are provided with flanges 18 between which is interposed a ring 17, the said flanges and ring being connected together by rivets or other suitable fastening elements 19. The sections are adapted when arranged in the casing, to abut with the adjacent sections as illustrated at $19^a$. An inwardly extending apertured lug is formed on each member at the opposite ends thereof and the same are adapted to abut with similar lugs formed on the adjacent members to dispose the apertures in alinement. A wire 21 is passed through the apertures in said lugs for securing the sections of the filler tube together, the extremities of said wires being interengaged whereby to prevent relative separation of the sections and produce a unitary structure. In order to add greater resiliency to the filler tube, each of the members is provided with a plurality of plaits or folds 22 as clearly illustrated in Fig. 2 of the drawings. In order to eliminate friction which might otherwise occur due to relative movement between the free overlapping edges of the members, as the tire is deflected while in use, ball bearings 23 are provided and mounted in the ball races 24, which are secured to the outer face of the innermost overlapped edge 16.

I would state in conclusion that while the illustrated example constitutes a practical embodiment of my invention, I do not limit myself strictly to the mechanical details herein illustrated, since manifestly the same can be considerably varied without departure from the spirit of the invention as defined in the appended claims.

Having thus described my invention, I claim as new and desire to secure by Letters Patent:

1. In a device of the class described, a resilient tube adapted to be placed inside a resilient tire casing, said tube being constructed in halves arranged so that the outer edges of the halves overlap, anti-friction means disposed between said overlapped edges, and folds formed in each half adapted to increase the resiliency thereof.

2. In a device of the class described, a resilient, metallic tube constructed in halves and adapted to be placed within a resilient tire casing, an inwardly extending flange formed on each half adjacent the beads of said casing, a ring positioned between said flanges of the halves, and means for connecting said flanges to the ring so as to form a unitary structure.

3. In a filler tube for resilient tire casings, a resilient split tube having overlapped edges, anti-friction means disposed between said overlapped edges, and folds formed in the opposite sides of said tube for increasing the resiliency thereof.

4. A filler tube adapted to be placed within a resilient tire casing, comprising a plurality of sections, each of which includes a pair of members connected at one edge and having the remaining edges overlapped, anti-friction means between said overlapped edges, folds formed in each member for increasing the resiliency thereof, and means for connecting said sections together to provide a unitary structure.

5. In a device of the character described, a resilient metallic tube constructed in halves and adapted to be placed within a resilient tire casing, said tube being divided into arcuate sections, inwardly projecting apertured lugs formed on each section, a pair of wires respectively passed through the lugs of each section for connecting the same to produce a unitary structure, means for securing the halves together at one edge with the remaining free edges in overlapped relation, and anti-friction means disposed between said overlapped edges.

WILLIAM B. SHAW.